(12) United States Patent
Howlett

(10) Patent No.: US 11,794,674 B2
(45) Date of Patent: Oct. 24, 2023

(54) SOLAR AWNING FOR AN ELECTRIC POWER GENERATION SYSTEM

(71) Applicant: Bradford C Howlett, Laguna Niguel, CA (US)

(72) Inventor: Bradford C Howlett, Laguna Niguel, CA (US)

( * ) Notice: Subject to any disclaimer, the term of this patent is extended or adjusted under 35 U.S.C. 154(b) by 0 days.

(21) Appl. No.: 17/535,424

(22) Filed: Nov. 24, 2021

(65) Prior Publication Data

US 2023/0158977 A1    May 25, 2023

(51) Int. Cl.
*B60R 16/03*    (2006.01)
*B60P 3/36*    (2006.01)
*H02S 20/30*    (2014.01)
*H02J 7/35*    (2006.01)
*F03D 9/32*    (2016.01)

(52) U.S. Cl.
CPC .......... *B60R 16/0307* (2013.01); *B60P 3/36* (2013.01); *F03D 9/32* (2016.05); *H02J 7/35* (2013.01); *H02S 20/30* (2014.12)

(58) Field of Classification Search
CPC ..... B60R 16/0307; B60R 16/03; H02S 20/30; F03D 9/32; B60P 3/36; H02J 7/35
See application file for complete search history.

(56) References Cited

U.S. PATENT DOCUMENTS

2022/0281307 A1*    9/2022    Kemmet ................. B60G 5/00

FOREIGN PATENT DOCUMENTS

CN    201800612 U    *    4/2011

* cited by examiner

*Primary Examiner* — Robert L Deberadinis
(74) *Attorney, Agent, or Firm* — Morland C. Fischer

(57) ABSTRACT

An electric power generation system is disclosed to produce electrical energy. The electric power generation system includes a solar awning that is ideally carried by a vehicle that is operable under its own power or towed behind a lead vehicle. The solar awning has a solar base attached to the roof of the vehicle and a pair of solar arms that are hingedly connected to respective opposite sides of the solar base. Each of the solar base and the pair of solar arms has an array of solar panels that convert solar energy to electrical energy. The solar awning is folded from an open configuration for maximum exposure to the sun at which the solar arms lie side-by-side the solar base to a closed configuration for minimum exposure to the sun at which the solar arms rotate downwardly from the solar base to lie alongside the vehicle.

11 Claims, 3 Drawing Sheets

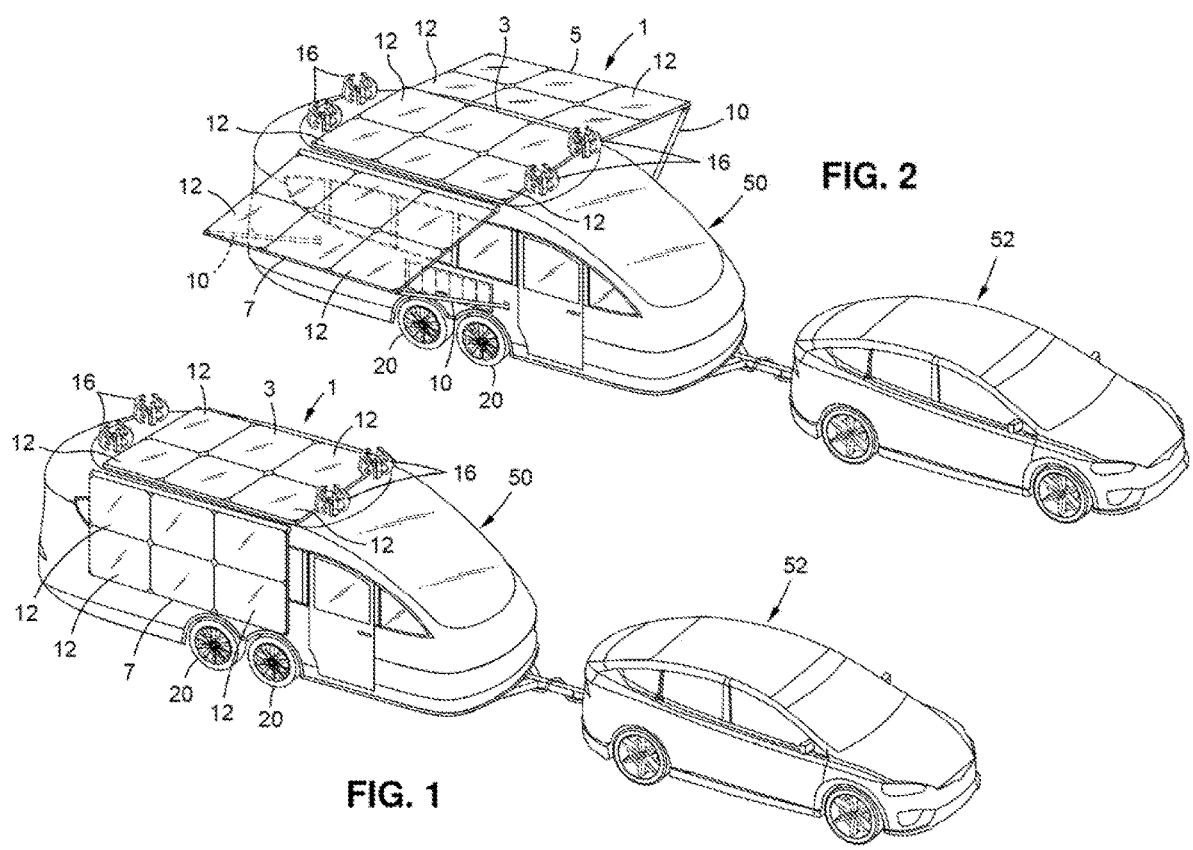

SOLAR AWNING FOR AN ELECTRIC POWER GENERATION SYSTEM

BACKGROUND OF THE INVENTION

1. Field of the Invention

This invention relates to an electric power generation system including a solar awning to be carried by a vehicle that is either self-powered or towed behind a lead vehicle so that solar energy is received by solar panels of the solar awning and converted to an AC or a DC voltage for battery storage for performing any of a variety of applications. The solar awning is mounted on the roof of the vehicle and adapted to be folded between a compact closed configuration at night and an expanded open configuration for maximum exposure to the sun during the day.

2. Background Art

Solar power systems have been used to provide power for off-grid (i.e., stand-alone) household applications, on-grid (i.e., electric utility grid-feed) applications, and hybrid (i.e., with battery storage) applications. Conventional solar power systems typically include an array of solar panels that convert solar energy (i.e., sunlight) to DC power by what is commonly referred to as the photovoltaic effect. This DC power can be stored by a battery for use later on or supplied to a solar inverter where it is converted to AC power to operate electrical appliances or to be fed back to the grid maintained by an electrical utility in order to reduce a consumer's electrical utility bill.

It is known to mount an array of solar panels on the roof of a motor vehicle at which to receive energy generated by the sun. However, such solar panel arrays are fixed in place on the vehicle roof so that their orientation relative to the sun cannot be changed whether the vehicle is moving or stationary or whether there is bright sunlight during the day or darkness due to cloudy weather conditions or when the vehicle is parked in the shade. In this same regard, the sun-facing area of the conventional rooftop solar arrays that are exposed to the sun cannot be expanded to take advantage of bright sunlight conditions during the day or reduced during darkness or night time conditions. Therefore, the power that is produced by the conventional vehicle mounted solar array is undesirably limited in the brightest daylight conditions.

SUMMARY OF THE INVENTION

In general terms, a solar awning is disclosed to be carried by a motor vehicle whether the vehicle is self-powered or towed behind a lead vehicle. The solar awning is part of an electric power generation system to provide power for storage by a bank of rechargeable (e.g., lithium) batteries located within the vehicle, or to run a variety of external household appliances, or to be fed back to the grid of an electrical utility to reduce the power bill of a consumer.

The solar awning herein disclosed includes a solar base that is connected by fasteners to the roof of the vehicle. A pair of solar arms are pivotally attached by hinges to opposite sides of the solar base. Each of the solar base and the solar arms of the solar awning includes an array of solar panels that are adapted to convert sunlight to DC power. The solar awning is capable of being manually manipulated between an opened expanded configuration and a closed compact configuration. When there is bright sunlight, the solar awning is unfolded to its open expanded configuration. In this case, the solar arms are positioned so as to lie coplanar with and extend laterally from the solar base so that the solar awning has a maximum exposure to the sun. Removable struts extending from the opposite sides of the vehicle hold the solar arms up and side-by-side the solar base. During the night or if the vehicle is parked in the shade, the solar awning is folded to its closed compact configuration. In this case, the solar arms are rotated at the hinges downwardly relative to the solar base so as to lie alongside the vehicle, whereby the solar awning has a minimal exposure to the sun.

The electric power generation system of which the solar awning is a part also includes a set of wind driven generators that are attached to the roof of the vehicle adjacent the solar awnings. The solar generators rotate in response to a windy condition to provide an additional supply of DC power. Mounted on the bottom of the vehicle is a set of wheel driven generators that are coupled by linking arms to respective ones of the wheels of the vehicle. The shafts of the wheel driven generators rotate in response to the rotation of the wheels while the vehicle is in motion to provide another supply of DC power. The DC power produced by the solar awning, the set of solar generators and the set of wheel driven generators can be supplied to and stored by a bank of rechargeable batteries carried by the vehicle for future use. In the alternative, the DC power can be supplied to a power supply control system having a solar inverter which converts the DC power to AC power. An electricity switchboard of the power supply control system directs the AC power from the solar inverter to any one of a variety of applications such as external household appliances or feeding the grid of an electric utility.

BRIEF DESCRIPTION OF THE DRAWINGS

FIG. 1 shows a vehicle being towed with an electric power generation system attached to the roof of the vehicle and including a plurality of wind driven generators and a solar awning that is folded in a compact collapsed configuration;

FIG. 2 shows the vehicle being towed in FIG. 1 with the solar awning of the electric power generation system unfolded to an expanded open configuration;

DESCRIPTION OF THE PREFERRED EMBODIMENT

Figure 4:
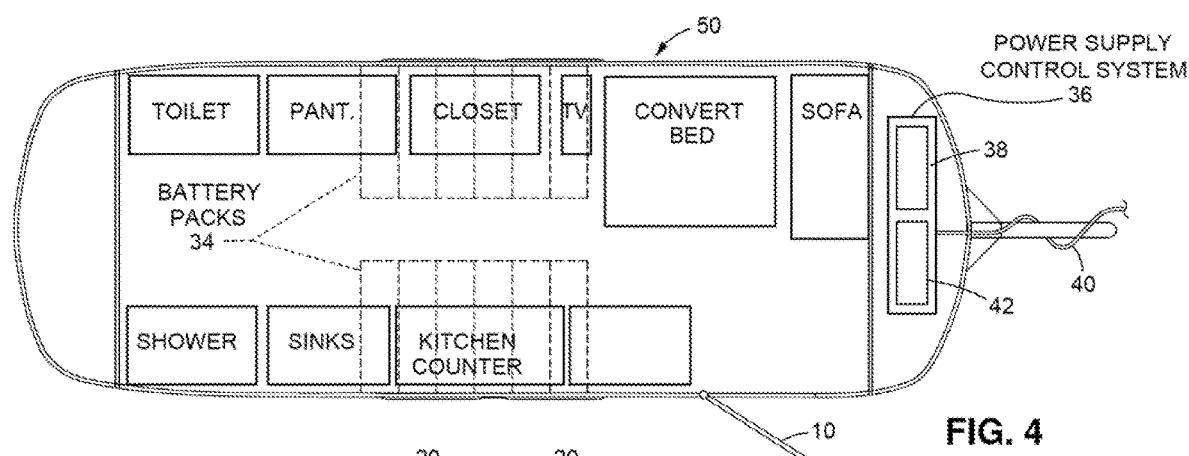
FIG. 4 shows the interior of the vehicle being towed and the electric power generation system including a bank of storage batteries and a solar inverter.

Referring to the drawings, FIGS. 1 and 2 show a vehicle 50 having attached thereto an electric power generation system which includes a solar awning 1. Although the vehicle 50 pictured is a recreational vehicle, it is to be understood that other vehicles, such as a van, camper, trailer, or the like, may be substituted therefor. As will soon be explained, the solar awning 1 of the power generation system is adapted to collect solar energy and provide a source of electric power whether the vehicle 50 to which it is attached is moving or at rest. Moreover, it is to be understood that the vehicle 50 is one which is capable of either moving independently under its own power or being towed from behind a lead vehicle 52.

The solar awning 1 of the electric power generation system being carried by the vehicle 50 includes a rectangular solar base 3 that is located between and pivotally connected to a pair of rectangular solar arms or appendages 5 and 7. The solar base 3 of solar awning 1 is attached to the roof of the vehicle 50 by means of suitable fasteners (not shown). Each of the pair of solar arms 5 and 7 is pivotally connected to one of the opposite sides of the solar base 3 by means of one or more hinges 9, such as a piano hinge.

Accordingly, the solar awning 1 can be manually manipulated between opened or closed configurations depending upon the brightness of the sun and whether the vehicle 50 is in motion. FIG. 1 shows the vehicle 50 in motion when the solar awning 1 is folded to its compact closed configuration. In this case, each of the solar arms 5 and 7 has been rotated downwardly at its hinged connection to the solar base 3 so as to lie alongside one side of the vehicle 50. FIG. 2 shows the vehicle 50 at rest such as when it is parked during periods of non-use and the solar awning 1 is unfolded to its expanded open configuration. In this case, each of the solar arms 5 and 7 is rotated upwardly from its downturned configuration of FIG. 1 through an angle of about 90 degrees until the solar arms 5 and 7 extend laterally outward to lie in substantially coplanar alignment with and side-by-side the solar base 3.

With the solar awning 1 unfolded to its opened configuration of FIG. 2, it is positioned to receive the maximum amount of solar energy. To hold the solar arms 5 and 7 up so as to lie side-by-side the solar base 3, pairs of struts or support bars 10 are removably attached to receptacles located at each side of the vehicle 50. Each strut 10 extends from one side of the vehicle 50 to an outside corner of one of the solar arms 5 or 7. When it is desirable to fold the solar awning 1 to its compact closed configuration of FIG. 1, the struts 10 are removed from the vehicle 50 so that the solar arms 5 and 7 can be rotated downwardly relative to the solar base 3. When the solar awning 1 is in its opened expanded configuration as just described, it functions as a source of electric power for a purpose that will soon be described. With the solar awning 1 folded to its closed configuration of FIG. 1, it receives a minimum amount of solar energy. Nevertheless, the solar base 3 of the solar awning 1 remains at all times positioned atop the vehicle 50 and aimed skywards by which to receive solar energy when the vehicle 50 is stopped or parked so that electric power can still be produced.

Each of the solar base 3 and the pair of solar arms 5 and 7 of the solar awning 1 contains an array of commercially available solar panels 12. Each solar panel 12 typically contains a plurality of silicon-based photovoltaic cells that produce direct current (DC) electricity from sunlight. The number and arrangement of the solar panels 12 of each array is a matter of choice and should not be regarded as a limitation of this invention. Each of the solar base 3 and the solar arms 5 and 7 has a frame (designated 14 and best shown in FIG. 5) extending around the periphery thereof, and the solar panels 12 are joined one to the other by cables and surrounded by the frames 14. The solar panels 12 of each array are oriented so as to receive the most sunlight when the solar awning 1 is unfolded to its open configuration of FIG. 2.

Continuing to refer to FIGS. 1 and 2, a plurality of (e.g., four) conventional wind-driven generators 16 are shown affixed to the roof of the vehicle 50 adjacent the solar awning 1. By way of example only, each of the generators 16 is a 4500 watt, 4 blade auto windward lantern wind turbine generator manufactured by Dayton as its Part Number CO839. In those in situations where it is cloudy or when the vehicle is parked at a shady location and a windy condition exists, the wind-driven generators 16 are caused to rotate to provide another source of electric power for use in combination with or in place of the solar awning 1 for a purpose that will also soon be described.

Figure 3:
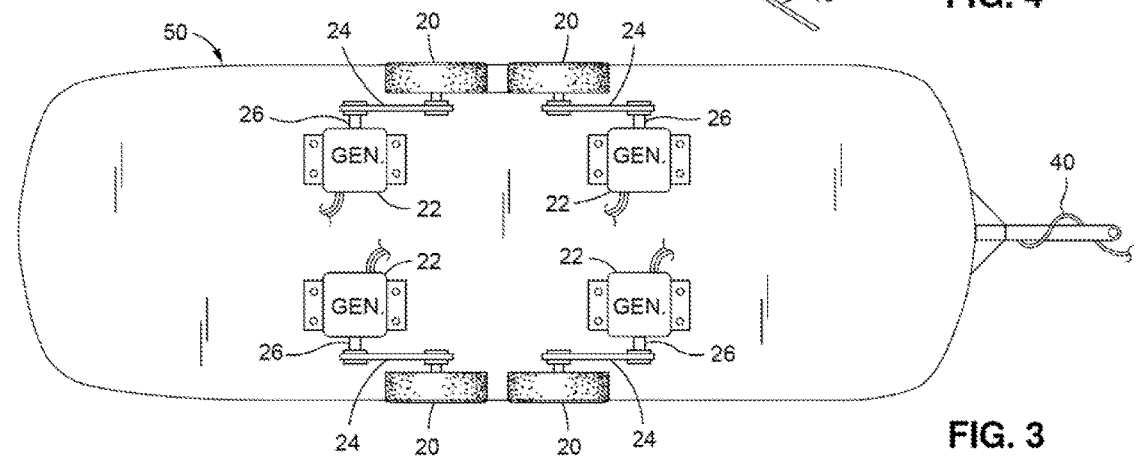
FIG. 3 shows a plurality of wheel driven generators of the electric power generation system attached to the bottom of the vehicle being towed and coupled to the wheels thereof.

Turning now to FIG. 3 of the drawings, the bottom of the vehicle 50 of FIGS. 1 and 2 is shown. The vehicle 50 rides from place-to-place on a plurality of (e.g., four) wheels 20 mounted on the vehicle at the bottom thereof. Each of the wheels 20 is coupled to a conventional wheel driven electric generator 22 by way of a linking arm 24. By way of example only, each wheel driven electric generator 22 is a ⅛ HP DC motor manufactured by Dayton of South Korea as its Model No. 22L405. When the vehicle 50 is riding on a roadway and the vehicle wheels 20 turn, the linking arms 24 transfer a rotational force from the wheels to respective shafts 26 of generators 22, whereby the shafts are caused to rotate. The wheel driven generators 22 correspondingly provide an additional source of electric power in response to their rotating shafts 26.

FIG. 4 of the drawings shows the interior of the vehicle 50 within which a variety of conveniences are located to be used by any individuals riding in the vehicle. The number and type of such conveniences carried by vehicle 50 form no part of this invention. Vehicle 50 also carries a bank of air cooled (e.g., lithium) batteries 34 that are capable of storing for a later use the electric power produced by the solar awning 1, the wind driven generators 16, and the wheel driven generators 22 of the electric power generator system that is shown in FIGS. 1-3. The batteries 34 are preferably connected in electrical series to provide a DC output of 48 volts.

Also carried by the vehicle 50 is a power supply control system 36. The power supply control system 36 includes a DC to AC solar inverter 38 by which any DC voltages supplied to the solar inverter 38 from the solar awning 1, the wind driven generators 16, and the wheel driven generators 22 are converted to an AC voltage. By way of example only, the DC to AC solar inverter 38 herein described is a 12 kwatt, 48 volt split phase pure sine wave power inverter manufactured by Sungold Power.

Figure 5:
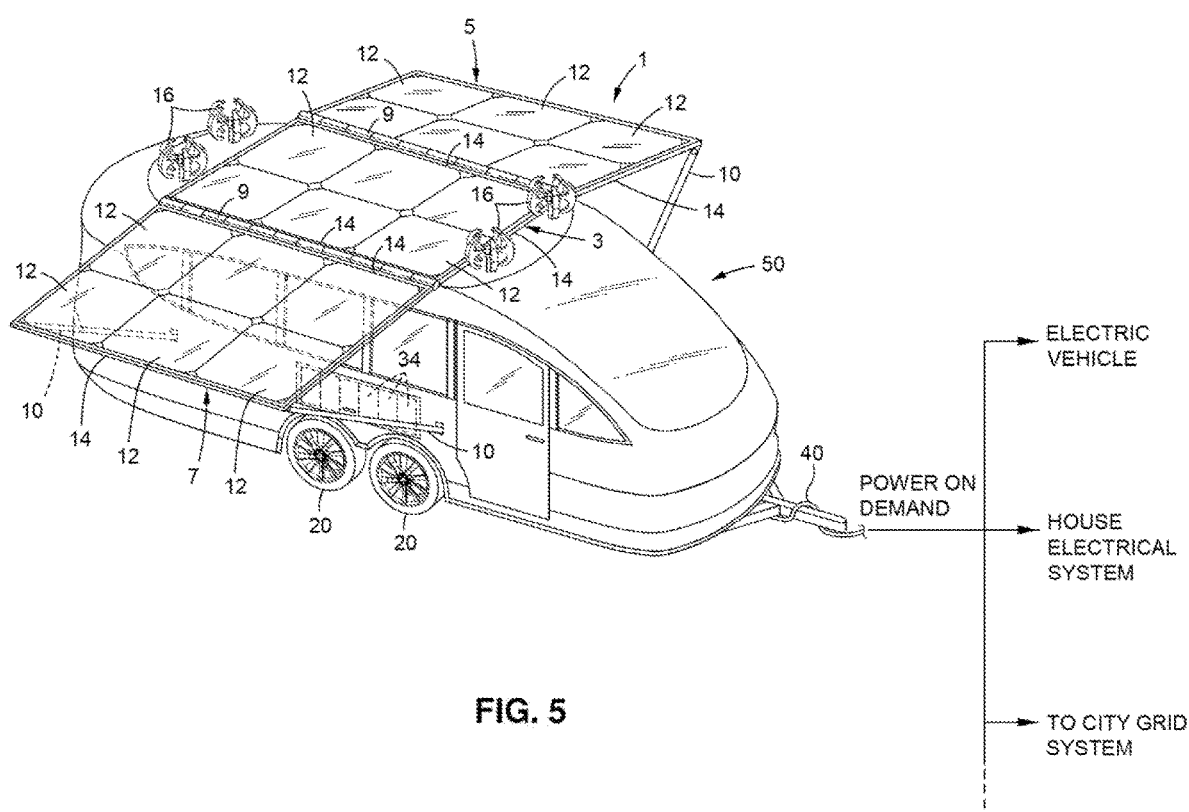
FIG. 5 illustrates the optional distribution of the power that is produced by the electric power generation system.

FIG. 5 of the drawings shows the vehicle 50 standing alone with the AC voltage output of the solar inverter 38 of the power supply control system 36 being supplied by a power cable 40 for any one or more AC power applications. In the example of FIG. 5, the AC power applications that are coupled to the power supply control system 36 by cable 40 include, but are not limited to, an electric motor vehicle, the electrical system found in a house, and the city grid system from which the aforementioned house receives its usual electric power. In the case of the city grid system, any AC power that is added thereto by way of the power cable 40 will likely reduce the homeowner's electrical utility bill. Any AC power that is supplied to either one of the electric vehicle or the house electrical system by way of the power cable 40 will likely reduce the homeowner's consumption of power supplied by the local utility.

To this end, the power supply control system 36 of FIG. 4 also includes an electricity switchboard 42 by which a user may choose which of the applications shown in FIG. 5 will receive AC power by way of the power cable 40. By virtue of the foregoing, inexpensive and clean solar energy that is converted to DC power and stored by the bank of batteries 34 or converted to AC power by the solar inverter 38 can be efficiently used when the vehicle 50 is at rest and parked at a location where sunlight is either bright or lacking.

The invention claimed is:

1. An electric power generation system to be mounted on a vehicle having a top, a pair of sides, and wheels on which the vehicle rolls from place-to-place, said electric power generation system including a solar awning comprising:
 a solar base having first and opposite sides to be attached to the top of the vehicle and having a first solar panel adapted to receive solar energy and convert said solar energy to electrical energy;
 a first solar arm having a second solar panel adapted to receive solar energy and convert said solar energy to electrical energy, said first solar arm being pivotally connected to said solar base and rotatable relative to said solar base between a first position lying coplanar with said solar base and a second position extending downwardly from said solar base; and
 a solar inverter carried by the vehicle for converting DC power to AC power, the first solar panel of said solar base and the second solar panel of said first solar arm being electrically connected to said solar inverter, whereby said solar inverter produces AC power in response to the solar energy, received by said first and second solar panels; and
 a power cable connected to said solar inverter and extending from the vehicle and adapted to supply the AC power produced by said solar inverter to an AC powered electrical system located remotely from the vehicle.

2. The electric power generation system recited in claim 1, said solar awning also comprising a second solar arm having a third solar panel adapted to receive solar energy and convert said solar energy to electrical energy, said second solar arm being pivotally connected to said solar base and rotatable relative to said solar base between a first position lying coplanar with said solar base and a second position extending downwardly from said solar base.

3. The electric power generation system recited in claim 2, wherein the first and second solar arms of said solar awning are pivotally connected to respective ones of the first and opposite sides of said solar base so that said first and second solar arms lie side-by-side said solar base and extend laterally outwardly from said solar base when each of said first and second solar arms is in the first position thereof and the first acid second solar arm are rotated downwardly through an angle of 90 degrees relative to said solar base to lie adjacent respective ones of the pair of sides of the vehicle when each of said first and second solar arms is in the second position thereof.

4. The electric power generation system recited in claim 2, wherein the first and second solar arms of said solar awning are pivotally connected to respective ones of the first and opposite sides of said solar base by means of hinges.

5. The electric power generation system recited in claim 2, said, solar awning also comprising first and second awning support bars removably attached between respective ones of the pair of sides of the vehicle and the first and second solar arms of said solar awning to hold up each of said first and second solar arms in the first position thereof.

6. The electric power generation system recited in claim 1, also including at least one wind driven generator carried by the vehicle and adapted to produce electrical energy in response to a supply of wind received thereby.

7. The electric power generation system recited in claim 6, wherein said at least one wind driven generator is attached to the top of the vehicle to lie adjacent the solar base of said solar awning.

8. The electric power generation system recited in claim 1, also including at least one wheel driven generator carried by the vehicle and coupled to one of the wheels of the vehicle, said at least one wheel driven generator adapted to produce electrical energy in response to the rotation of the wheel while the vehicle is in motion.

9. The electric power generation system recited in claim 8, wherein said at least one wheel driven generator has a linking arm extending between the one of said wheels and a rotatable shaft of said at least one wheel driven generator, whereby a rotation of said one wheel causes said rotatable shaft to rotate and said at least one wheel driven generator to produce said electrical energy.

10. The electric power generation system recited in claim 1, also including at least one battery carried by the vehicle, the first and second solar panels of the solar base and the first solar arm of said solar awning being electrically connected to said battery by which the electrical energy produced by said first and second solar panels is stored by said battery.

11. A solar awning to be carried by a motor vehicle having a top for converting solar energy to electrical energy and comprising:
 a solar base mounted on the top of the vehicle and having first and opposite sides and a first solar panel to receive solar energy;
 a first solar arm having a second solar panel to receive solar energy, said first solar arm being hingedly connected to the first side of said solar base;
 a second solar arm having a third solar panel to receive solar energy, said second solar arm being hingedly connected to the opposite side of said solar base,
 each of said first and second solar arms being rotatable relative to said solar base from an expanded position at which said first and second solar arms extend laterally outward from and lie side-by-side said solar base and a folded position at which said first and second solar arms extend downwardly from and are aligned at an angle with respect to said solar base,
 each of the first, second and third solar panels of said solar base and said first and second solar arms adapted, to generate a first supply of electrical energy in response to the solar energy received thereby; and
 at least one wind driven electrical generator mounted on the top of the vehicle and adapted to rotate in response to wind blowing thereagainst while the vehicle is in motion in order to produce an additional supply of electrical energy.

\* \* \* \* \*